(12) United States Patent
Ben Hadj Fredj et al.

(10) Patent No.: US 12,537,652 B2
(45) Date of Patent: Jan. 27, 2026

(54) MONITORING DOWNLINK CONTROL INFORMATION FORMATS

(71) Applicant: Lenovo (Singapore) Pte. Ltd., New Tech Park (SG)

(72) Inventors: Abir Ben Hadj Fredj, Frankfurt am main (DE); Joachim Loehr, Wiesbaden (DE); Hyejung Jung, Northbrook, IL (US); Vijay Nangia, Woodridge, IL (US); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 491 days.

(21) Appl. No.: 18/011,481

(22) PCT Filed: Jun. 17, 2021

(86) PCT No.: PCT/IB2021/055377
§ 371 (c)(1),
(2) Date: Dec. 19, 2022

(87) PCT Pub. No.: WO2021/255693
PCT Pub. Date: Dec. 23, 2021

(65) Prior Publication Data
US 2023/0261839 A1 Aug. 17, 2023

Related U.S. Application Data

(60) Provisional application No. 63/040,406, filed on Jun. 17, 2020.

(51) Int. Cl.
*H04L 5/00* (2006.01)
*H04W 72/20* (2023.01)
*H04W 72/23* (2023.01)

(52) U.S. Cl.
CPC .......... *H04L 5/0053* (2013.01); *H04L 5/0094* (2013.01); *H04W 72/23* (2023.01)

(58) Field of Classification Search
CPC ... H04L 5/0053; H04L 5/0094; H04L 5/0058; H04W 72/23
See application file for complete search history.

(56) References Cited

U.S. PATENT DOCUMENTS

2020/0005165 A1* 1/2020 Baughman ............. G06N 20/10
2020/0015258 A1* 1/2020 Zhou ..................... H04W 72/20
(Continued)

FOREIGN PATENT DOCUMENTS

WO 2020029857 A1 2/2020

OTHER PUBLICATIONS

3GPP TSG RAN WG1#110, R1-2206452 Title:Draft CR on search set for PDCCH repetition (Year: 2022).*
(Continued)

*Primary Examiner* — Faruk Hamza
*Assistant Examiner* — Abusayeed M Haque
(74) *Attorney, Agent, or Firm* — Kunzler Bean & Adamson

(57) ABSTRACT

Apparatuses, methods, and systems are disclosed for monitoring downlink control information formats. One method includes receiving a first configuration for a first downlink control information format from a network entity. The first configuration is associated with a first search space set and a first scheduling request configuration. The method includes receiving a second configuration for a second downlink control information format from the network entity. The second configuration is associated with a second search space set and a second scheduling request configuration. The method includes monitoring physical downlink control channel candidates in a control resource set for the
(Continued)

first downlink control information format, the second downlink control information format, or a combination thereof.

18 Claims, 6 Drawing Sheets

(56) References Cited

U.S. PATENT DOCUMENTS

| | | | |
|---|---|---|---|
| 2020/0275412 A1* | 8/2020 | Kim | H04L 1/1887 |
| 2020/0322099 A1* | 10/2020 | Park | H04W 72/20 |
| 2020/0367080 A1* | 11/2020 | Salah | H04W 72/1273 |
| 2021/0258935 A1 | 8/2021 | Zhang et al. | |
| 2022/0141872 A1* | 5/2022 | Wang | H04W 74/0816 370/329 |
| 2022/0150917 A1* | 5/2022 | Wang | H04W 16/14 |

OTHER PUBLICATIONS

PCT/IB2021/055377, "Notification of Transmittal of the International Search Report and the Written Opinion of the International Searching Authority, or the Declaration", Oct. 4, 2021, pp. 1-14.
Samsung, "Remaining issues for PDCCH-based power saving signal/channel", 3GPP TSG RAN WG1 #99 R1-1912486, Nov. 18-22, 2019, pp. 1-7.
Ericsson, "New SID on support of reduced capability NR devices", 3GPP TSG RAN Meeting #86 RP-193238, Dec. 9-12, 2019, pp. 1-5.
3GPP, "3rd Generation Partnership Project; Technical Specification Group Services and System Aspects; Study on enhancements for cyber-physical control applications in vertical domains Stage 1 (Release 17)", 3GPP TR 22.832 V17.1.0, Dec. 2019, pp. 1-91.
3GPP, "3rd Generation Partnership Project; Technical Specification Group Services and System Aspects; Service requirements for cyber-physical control applications in vertical domains; Stage 1 (Release 17)", 3GPP TS 22.104 V17.2.0, Dec. 2019, pp. 1-76.
3GPP, "3rd Generation Partnership Project; Technical Specification Group Services and System Aspects; Study on Communication for Automation in Vertical Domains (Release 16)", 3GPP TR 22.804 V16.2.0, Dec. 2018, pp. 1-196.
3GPP, "3rd Generation Partnership Project; Technical Specification Group Radio Access Network; Physical layer procedures for shared spectrum channel access (Release 16)", 3GPP TS 37.213 V16.1.0, Mar. 2020, pp. 1-25.
3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.
3GPP, "3rd Generation Partnership Project; Technical Specification Group Radio Access Network; NR; Radio Link Control (RLC) protocol specification (Release 16)", 3GPP TS 38.322 V16.0.0, Mar. 2020, pp. 1-33.
3GPP, "3rd Generation Partnership Project; Technical Specification Group Radio Access Network; NR; Packet Data Convergence Protocol (PDCP) specification (Release 16)", 3GPP TS 38.323 V16.0.0, Mar. 2020, pp. 1-37.

* cited by examiner

MONITORING DOWNLINK CONTROL INFORMATION FORMATS

CROSS-REFERENCE TO RELATED APPLICATIONS

This application claims priority to U.S. Patent Application Ser. No. 63/040,406 entitled "APPARATUSES, METHODS, AND SYSTEMS FOR A METHOD TO REDUCE PDCCH MONITORING FOR REDUCED CAPABILITY DEVICES" and filed on Jun. 17, 2020 for Abir Ben Hadj Fredj, which is incorporated herein by reference in its entirety.

FIELD

The subject matter disclosed herein relates generally to wireless communications and more particularly relates to monitoring downlink control information formats.

BACKGROUND

In certain wireless communications networks, different downlink control information formats may be used. A device may use excessive power if monitoring for multiple downlink control information formats.

BRIEF SUMMARY

Methods for monitoring downlink control information formats are disclosed. Apparatuses and systems also perform the functions of the methods. One embodiment of a method includes receiving a first configuration for a first downlink control information format from a network entity. The first configuration is associated with a first search space set and a first scheduling request configuration. In some embodiments, the method includes receiving a second configuration for a second downlink control information format from the network entity. The second configuration is associated with a second search space set and a second scheduling request configuration. In certain embodiments, the method includes monitoring physical downlink control channel candidates in a control resource set for the first downlink control information format, the second downlink control information format, or a combination thereof.

One apparatus for monitoring downlink control information formats includes a user equipment. In some embodiments, the apparatus includes a receiver that: receives a first configuration for a first downlink control information format from a network entity, wherein the first configuration is associated with a first search space set and a first scheduling request configuration; and receives a second configuration for a second downlink control information format from the network entity, wherein the second configuration is associated with a second search space set and a second scheduling request configuration. In various embodiments, the apparatus includes a processor that monitors physical downlink control channel candidates in a control resource set for the first downlink control information format, the second downlink control information format, or a combination thereof.

Another embodiment of a method includes transmitting, from a network entity, a first configuration for a first downlink control information format. The first configuration is associated with a first search space set and a first scheduling request configuration. In some embodiments, the method includes transmitting, from the network entity, a second configuration for a second downlink control information format. The second configuration is associated with a second search space set and a second scheduling request configuration. In certain embodiments, the method includes transmitting the first downlink control information format, the second downlink control information format, or a combination thereof.

One apparatus for transmitting downlink control information formats includes a network entity. In some embodiments, the apparatus includes a transmitter that: transmits a first configuration for a first downlink control information format, wherein the first configuration is associated with a first search space set and a first scheduling request configuration; transmits a second configuration for a second downlink control information format, wherein the second configuration is associated with a second search space set and a second scheduling request configuration; and transmits the first downlink control information format, the second downlink control information format, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
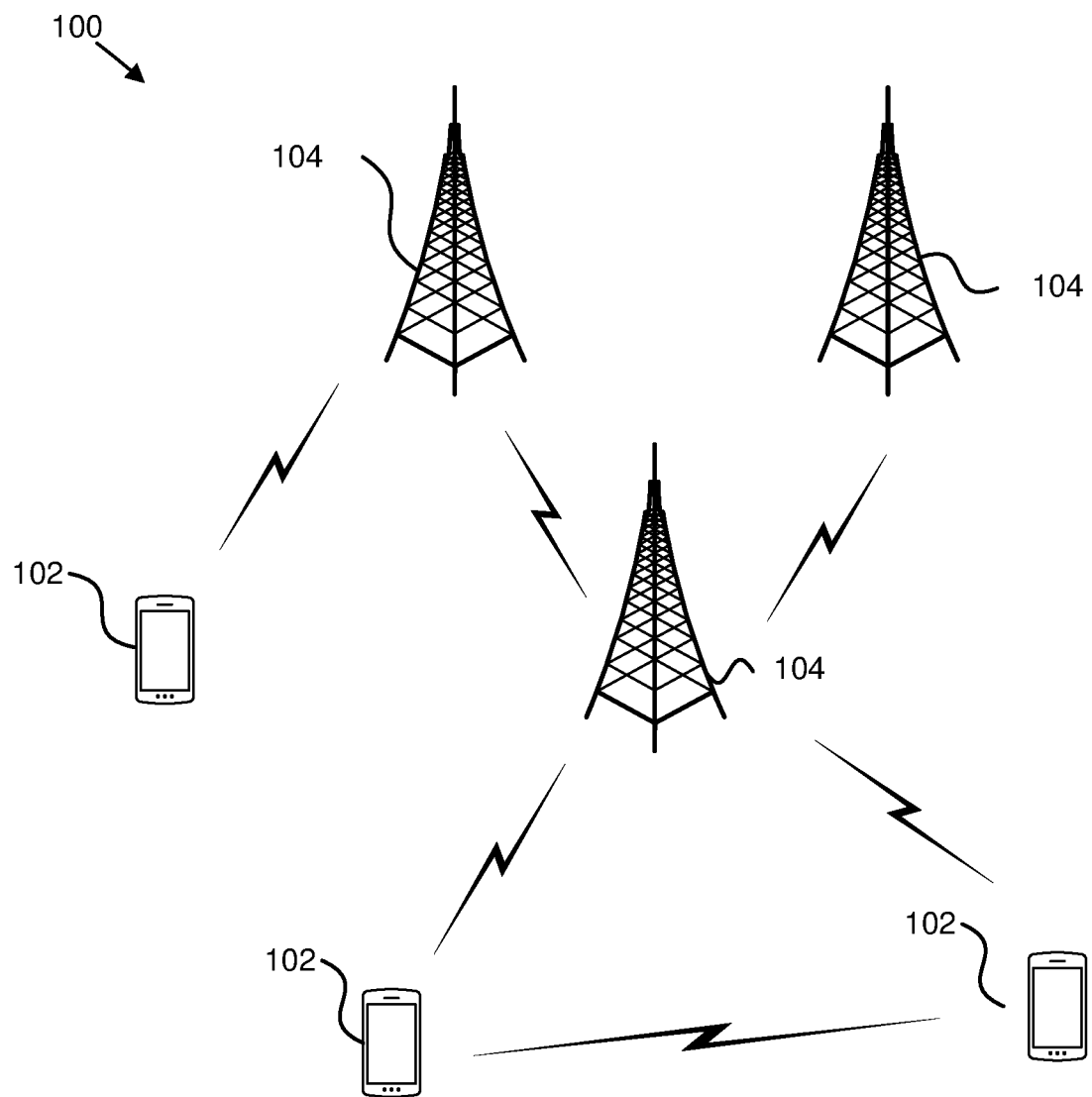
FIG. 1 is a schematic block diagram illustrating one embodiment of a wireless communication system for monitoring downlink control information formats.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for monitoring downlink control information formats. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive a first configuration for a first downlink control information format from a network entity. The first configuration is associated with a first search space set and a first scheduling request configuration. In some embodiments, the remote unit 102 may receive a second configuration for a second downlink control information format from the network entity. The second configuration is associated with a second search space set and a second scheduling request configuration. In certain embodiments, the remote unit 102 may monitor physical downlink control channel candidates in a control resource set for the first downlink control information format, the second downlink control information format, or a combination thereof. Accordingly, the remote unit 102 may be used for monitoring downlink control information formats.

In certain embodiments, a network unit 104 may transmit a first configuration for a first downlink control information format. The first configuration is associated with a first search space set and a first scheduling request configuration. In some embodiments, the network unit 104 may transmit a second configuration for a second downlink control information format. The second configuration is associated with a second search space set and a second scheduling request configuration. In certain embodiments, the network unit 104 may transmit the first downlink control information format, the second downlink control information format, or a combination thereof. Accordingly, the network unit 104 may be used for transmitting downlink control information formats.

Figure 2:
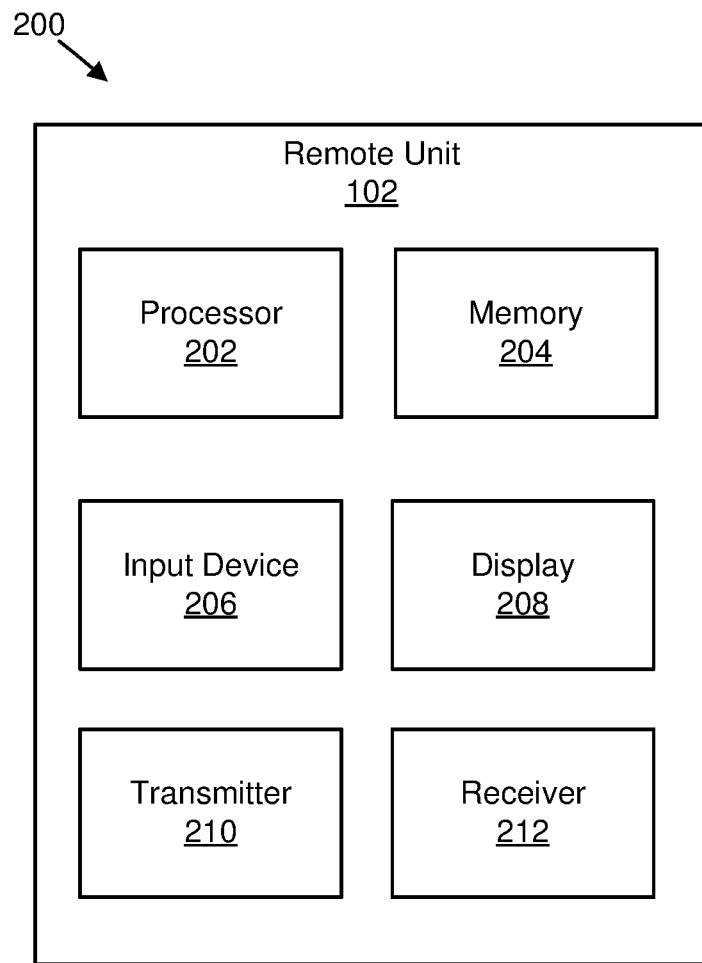
FIG. 2 is a schematic block diagram illustrating one embodiment of an apparatus that may be used for monitoring downlink control information formats.

FIG. 2 depicts one embodiment of an apparatus 200 that may be used for monitoring downlink control information formats. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 may transmit information described herein and/or the receiver 212 may receive information described herein and/or the processor 202 may process information described herein.

In certain embodiments, the receiver 212 may receive a first configuration for a first downlink control information format from a network entity, wherein the first configuration is associated with a first search space set and a first scheduling request configuration; and receive a second configuration for a second downlink control information format from the network entity, wherein the second configuration is associated with a second search space set and a second scheduling request configuration. In various embodiments, the processor 202 may monitor physical downlink control channel candidates in a control resource set for the first downlink control information format, the second downlink control information format, or a combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
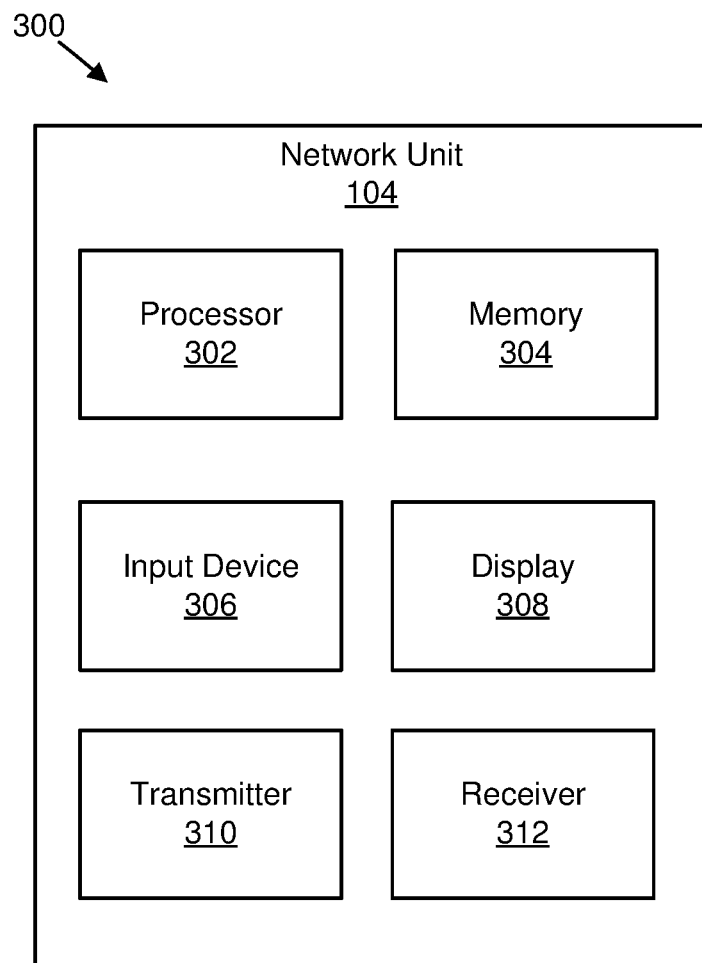
FIG. 3 is a schematic block diagram illustrating one embodiment of an apparatus that may be used for monitoring downlink control information formats.

FIG. 3 depicts one embodiment of an apparatus 300 that may be used for monitoring downlink control information formats. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310: transmits a first configuration for a first downlink control information format, wherein the first configuration is associated with a first search space set and a first scheduling request configuration; transmits a second configuration for a second downlink control information format, wherein the second configuration is associated with a second search space set and a second scheduling request configuration; and transmits the first downlink control information format, the second downlink control information format, or a combination thereof.

In certain embodiments, network communications may be used to connect everything to anything. In such embodiments, internet of things ("IoT") devices may connect to monitoring stations to generate actions based on data analytics. Moreover, in such embodiments, real time events may be monitored in critical areas to provide necessary security or other related monitoring functionality. Wireless sensors may be one example of such devices. These devices may have a long battery life to facilitate a low cost of operations and low maintenance. A long battery life may facilitate avoiding replacement and avoiding a cost of connecting to a wired power source. To facilitate long battery life, power savings method may be used. For wireless sensors and similar IoT devices a long battery life is important. Some devices that may benefit from a long battery life may include wearables such as smart watches, rings, health related devices, medical monitoring devices, and so forth (e.g., devices that are small in size).

In some embodiments, devices may be designed based on the following: 1) device complexity: a main motivation for a device type to lower the device cost and complexity as compared to high-end enhanced mobile broadband ("eMBB") and ultra reliable low latency communication ("URLLC") devices (e.g., industrial sensors); 2) device size: a requirement for a design having a compact form factor; and 3) deployment scenarios: a system may support all frequency range 1 ("FR1") and/or frequency range 2 ("FR2") bands for frequency division duplexing ("FDD") and time division duplexing ("TDD").

Various embodiments may include industrial wireless sensors having a communication service availability of 99.99% and end-to-end latency less than 100 ms. The reference bit rate may be less than 2 Mbps (e.g., potentially asymmetric such as for uplink ("UL") heavy traffic) and the device may be stationary. The battery should last at least a few years. For safety related sensors, latency requirement may be lower than 5-10 ms.

Certain embodiments may correspond to video surveillance having a reference economic video bitrate of 2-4 Mbps, a latency <500 ms, and a reliability of 99%-99.9%. High-end video such as for farming may require 7.5-25 Mbps. Moreover, a traffic pattern for such devices may be dominated by UL transmissions.

Some embodiments may correspond to wearables in which a reference bitrate for smart wearable application may be 10-50 Mbps in downlink ("DL"), a minimum of 5 Mbps in UL, and a peak bit rate of the device higher than 150 Mbps for downlink and 50 Mbps for uplink. For such devices, a battery should last multiple days (e.g., up to 1-2 weeks).

Embodiments described herein may be used to achieve power saving and lower complexity operations.

In various embodiments, there may be three downlink control information ("DCI") formats for UL (e.g., DCI format 0_0, DCI format 0_1 and DCI format 0_2). UL DCI format 0_0 may be used for scheduling of a physical uplink shared channel ("PUSCH") transmission in one cell, which is different from DCI format 0_1 used for scheduling one or more PUSCH transmissions in one cell or for indicating configured grant ("CG") downlink feedback information ("DFI") ("CG-DFI") to a user equipment ("UE").

In certain embodiments, to reduce both complexity and power consumption, a number of DCI formats (e.g., with different sizes) that a UE monitors in one or more control resource sets ("CORESETs") on an active DL bandwidth part ("BWP") on each activated serving cell configured with physical downlink control channel ("PDCCH") monitoring according to corresponding search space sets (e.g., during active time if a discontinuous reception ("DRX") is configured) may be reduced. In such embodiments, by defining DCI formats targeted for one or more specific purposes (e.g., traffic flows with different specific traffic pattern and/or quality of service ("QoS") requirements), the UE may measurably reduce a number of blind decoding attempts. Moreover, configuring a fewer number of DCI formats that have an aligned size and are applicable to various traffics may facilitate reducing the number of blind decoding and providing PDCCH scheduling flexibility. This in turn may reduce power consumption of the UE. In one example, DCI formats with aligned sizes (e.g., with a field in the DCI or using different cyclic redundancy check ("CRC") scrambling for distinguishing different DCI formats), with a DCI format targeting one or more specific purposes (e.g., different traffic types, patterns, and/or QoS supported by the UE), may be beneficial for reducing a number of DCI formats with different sizes the UE monitors thereby providing scheduling flexibility.

In some embodiments, a UE performs blind decoding of PDCCH candidates according to a CORESET and search space configurations.

In various embodiments, when data arrives into a logical channel in a UE, the data arrival triggers a buffer status report ("BSR") to be generated for transmission. If the UE has no uplink shared channel ("UL-SCH") resource for BSR transmission, a scheduling request ("SR") may be triggered and transmitted on a PUCCH and/or a random access channel ("RACH"). A BSR medium access control ("MAC") control element ("CE") may be included in an UL-SCH resource scheduled (e.g., by the network—a gNB) in response to the UE having transmitted the SR.

In certain embodiments, DCI formats may be configured in a UE with reduced capability. UEs with reduced capability may be referred to as NR-Light devices.

In some embodiments, a UE monitors different DCI formats (e.g., for UL DCI) depending on which UL data and/or logical channel ("LCH") the UE requests UL-SCH resources for.

In various embodiments, a network configures a UE with a DCI format designed for a reduced capability device. In certain embodiments, a network may configure a UE with different versions or configurations of the same DCI format, such as a first DCI format of a first type with a first set of parameters or fields (e.g., a first DCI configuration) and a second DCI format also of the first type with a second set of parameters or fields (e.g., a second DCI configuration). In some embodiments, a first DCI format instance is a DCI format with a first set of configurable fields and a second DCI format instance is the same DCI format with a second set of configurable fields. In various embodiments, a field may be present in both the first DCI format and the second DCI format, but the field size in number of bits may be different in the first DCI format and the second DCI format. Different versions or configurations of the same DCI format may be configured by higher layer signaling (e.g., radio resource control ("RRC") signaling). Each configuration and/or version of a DCI format may be associated with an index which unambiguously identifies the respective configuration and/or version of the DCI format (e.g., payload of the DCI format is identified by the index). In certain embodiments, a first DCI format and a second DCI format may have the same or different DCI sizes. In some embodiments, a first DCI format is associated with a first search space set, and a second DCI format is associated with a second search space set. In various embodiments, a first DCI format and a second DCI format are associated to a same search space set. In certain embodiments, a first DCI format and a second DCI format are an UL DCI format.

In some embodiments, each configuration and/or version of a DCI format may be associated with a logical channel identifier ("ID"), a logical channel group ID, a logical channel type, a logical channel priority, and/or a QoS class identifier.

In various embodiments, a UE may implicitly determine which DCI formats to monitor depending on a SR configuration used for a SR for a physical uplink control channel ("PUCCH") transmission.

In certain embodiments, a network may associate a first DCI format to be applicable with a first SR configuration. The first SR configuration may be applicable for a first LCH type. In some embodiments, a network may map a second DCI format to be applicable with a second SR configuration. The second SR configuration may be applicable for a second LCH type.

In various embodiments, a MAC entity may be configured with zero, one, or more SR configurations. An SR configuration may include a set of PUCCH resources for SR across different BWPs and cells. Each SR configuration may correspond to one or more logical channels or to MAC CEs. Each SR configuration may be mapped to zero or one DCI format configuration configured by RRC. The SR configuration of a logical channel that triggered a BSR may be considered as a corresponding SR configuration for the triggered SR. If a SR is mapped to zero DCI format configurations, the UE may monitor for a preconfigured fallback DCI format upon having sent the SR.

In certain embodiments, a UE has data to send from a first LCH and it may transmit a first SR, thereby signaling to a network that it has traffic from the first LCH. In such embodiments, the network may turn on receiving the first SR, and may transmit control information using the first DCI format of the first type based on the first DCI configuration to the UE. The UE may only search or monitor for PDCCH candidates using the first DCI format (e.g., the UE does not monitor for PDCCH candidates using the second DCI format).

In some embodiments, PDCCH monitoring may be performed if there are multiple SRs.

In various embodiments, a UE transmits a SR associated with a first DCI configuration and associated with a first logical channel type. The UE may monitor PDCCH only for the first DCI configuration associated with the first logical channel type. If new data arrives at the UE in a further logical channel (e.g., of a second type) triggering a second BSR and/or SR, the UE sends a SR associated with the second configuration and associated with logical channel of the second type. In certain embodiments, a UE includes a second BSR indicating to a network buffer a status of a logical channel of a second type on an UL-SCH transmission (e.g., associated with a first DCI configuration). In some embodiments, immediately after sending a second SR or BSR, the UE may start monitoring in parallel for two DCI formats (e.g., first DCI format having the first configuration and second DCI format having the second configuration). In various embodiments, a maximum number of DCI formats may be defined and a UE may monitor multiple DCI formats in parallel. In certain embodiments, a UE may start monitoring after sending a BSR or SR of a second configuration (e.g., second SR) only after a first time offset. The first time offset may be received in a configuration message from a network. In some embodiments, a first time offset is fixed and known a priori to a UE.

In certain embodiments, a UE may monitor for a union of DCIs (e.g., third DCI) that schedule data for which UL-SCH resources are requested and that triggered a first SR and a second BSR and/or a second SR. In some embodiments, a third DCI is a third DCI format of a first type with a third set of parameters or fields. The third set of parameters or fields being a union of a first set of parameters or fields and a second set of parameters or fields. In various embodiments, for a field present in both a first set of parameters or fields and a second set of parameters or fields, a field size in number of bits in a third set of parameters may be a maximum of the field sizes in the first set of parameters and the second set of parameters. In certain embodiments, a UE may treat a configuration associated with a DCI of a second configuration to be a super set of a first configuration of DCI and second configuration of DCI—thus enabling the UE to only monitor downlink control information of the second configuration (e.g., second DCI format).

In some embodiments, there may be desynchronization between a UE and a gNB.

In various embodiments, when arrival of data for a second logical channel triggers a second scheduling request with a second configuration due to data being received by a second logical channel, a problem may occur if a scheduling request has not been received by a network and a UE has no more data to be sent from a logical channel of the first type. In such embodiments, to avoid such desynchronization issues, the UE continues to receive and monitor a first DCI format. In certain embodiments, a UE may include a BSR indicating to a network a buffer status of a logical channel of the second type. The network may, on receiving this buffer status, switch over to sending downlink control information using a second configuration associated with a logical channel of the second type. In some embodiments, to avoid a potential desynchronization between a UE and a network, the UE may continue to monitor both first and second configurations associated with a DCI of a first type for a finite time interval, and, following a first reception of downlink control information of a first type with the second configuration, cease to monitor for downlink control information of the first type with the first configuration. In various embodiments, a UE may cease to monitor a first DCI configuration on one or more of receptions of a PDCCH of a second DCI configuration indicating a retransmission of a first transport block ("TB") (e.g., of a second logical channel), a subsequent new TB (e.g., second TB of the second logical channel, new data indicator ("NDI") toggled), or expiry of a timer (e.g., based (e.g., sum of) on DRX drx-HARQ-RTT-TimerUL (e.g., the minimum duration before a UL hybrid automatic repeat request ("HARQ") retransmission grant is expected by a MAC entity) and/or drx-RetransmissionTimerUL (e.g., the maximum duration until a grant for UL retransmission is received)). This may indicate a successful completion of a PDCCH second DCI reception—UL-SCH transmission handshake between a network and a UE.

In certain embodiments, if a UE transmits an SR associated with a first DCI format and/or configuration different from a second DCI format and/or configuration being monitored currently, the UE aligns a size of the first DCI format and/or configuration with a size of the second DCI format and/or configuration for blind decoding of the first DCI format (or PDCCH with the first DCI configuration). After the UE successfully decodes a PDCCH candidate of the first DCI format and/or configuration and receives an indication of the first DCI format and/or configuration in the decoded PDCCH, the UE may assume an original size of the first DCI format and/or configuration (e.g., without size alignment) for blind decoding. In some embodiments, a UE may assume an original size of a first DCI configuration on one or more of reception of a PDCCH of the first DCI configuration indicating a retransmission of a first TB (e.g., of the first logical channel), a subsequent new TB (e.g., second TB such as of the first logical channel, NDI toggled), or expiry of a timer (e.g., based on DRX drx-HARQ-RTT-TimerUL and/or DRX drx-RetransmissionTimerUL)—this may indicate a successful completion of a PDCCH first DCI reception—UL-SCH transmission between the network and the UE.

In some embodiments, there may be a linkage between a BSR and a DCI format.

In various embodiments, if a UE has no UL shared channel resource to send a BSR in response to data arrival into a buffer for a logical channel, the UE transmits a SR. Once a SR has been sent and the network responds with an uplink grant, the BSR may be sent in the uplink grant resources and the network may then schedule uplink resources for data in the buffer according to the received BSR. In certain embodiments, other embodiments that relate to linking a scheduling request configuration to a DCI format configuration may be used to link buffer status information to a DCI format configuration. In some embodiments, a UE may trigger a regular scheduling request on receiving data to send from any logical channel After receiving a default downlink control information with a resource allocation to transmit data along with a buffer status report, the UE may switch to monitoring downlink control information associated with a logical channel (or logical channel group) with the highest priority included in the buffer status report. In such embodiments, the UE may receive an association of the DCI format to monitor for some or each of the supported logical channels. In various embodiments, a DCI monitoring switch after receiving default downlink control information may be based on a timer configuration (e.g., based on DRX drx-HARQ-RTT-TimerUL and/or DRX drx-RetransmissionTimerUL). In certain embodiments, a default downlink control information may be a default DCI format.

In various embodiments, a network may associate a first DCI format to be applicable with a first logical channel group ("LCG"). In certain embodiments, a network may map a second DCI format to be applicable with a second LCG. In such embodiments, a network may identify each of these logical channel groups by an LCG identifier that a UE reports to the network via a BSR along with an amount of data in an UL buffer for the specific LCG. Thus, if the UE has data to send from a first LCG, it reports to the network a corresponding LCG ID, thereby signaling to the network that it has traffic from the first logical channel group. The network, upon receiving the BSR associated with the first LCG, transmits control information to the UE using the first DCI format. The UE only monitors the PDCCH using the first DCI format.

In some embodiments, a gNB explicitly indicates a DCI format (e.g., included within a payload of DCI) to monitor based on received a scheduling request and/or BSR.

In various embodiments, a UE, on receiving data to send, may trigger a BSR and/or multiple SRs with different configurations applicable to each LCH channel with data to send. Upon receiving the BSR and/or different SRs, a network decides (e.g., based on a priority of data) which DCI format configuration to use for scheduling a UE and includes this information within first downlink control information (e.g., default downlink control information) sent to the UE following the receipt of the SRs. The first downlink control information may further include a timer indicating for how long the UE should monitor for the indicated DCI format configuration. The UE starts monitoring for the corresponding indicated DCI format configuration in response to having the indication within the first DCI. To identify the DCI format configuration to be used in the following time slots, the first DCI may include a field of x bits allowing to generate 2^x states configured by RRC parameters that each may indicate a DCI format configuration or a set of DCI format configurations. The UE and the gNB may then be synchronized. The x bits allow for a total of 2^x different configurations of a DCI format. In certain embodiments, a first downlink control information may include a timer indicating if a UE should start to monitor for an indicated DCI format configuration.

In some embodiments, to avoid desynchronization between a UE and a gNB, monitoring for an incorrect DCI format by the UE, a DCI acknowledgment ("ACK") and/or negative acknowledgement ("NACK") may be sent to the network to ensure the UE is not monitoring for the DCI format associated with the SR configuration that it has sent or the indicated DCI format configuration. A repetition mechanism may also be established as a solution for desynchronization issues whereby the DCI may be sent several times.

In various embodiments, there may be a fallback DCI. To ensure having a DCI format known for all types of UE specific purposes (e.g., traffic types, patterns, QoS, and logical channel types), a default DCI format may be defined. In one embodiment, a default DCI format may be the fallback DCI (e.g., DCI format 0_0).

In certain embodiments, there may be multiple active BWPs.

In some embodiments, an SR configuration includes a set of PUCCH resources for SR across different BWPs and cells. In such embodiments, a UE may transmit a SR on a first uplink active BWP configured with PUCCH resources. The SR may be linked to a first logical channel using a first SR configuration. The UE may monitor PDCCH using a first DCI format on an active downlink BWP of serving cells. In various embodiments, a UE monitors PDCCH using a first DCI format on an active DL BWP of a serving cell on which a UE has sent a SR.

In certain embodiments, a SR configuration may be linked and/or mapped to a serving cell for corresponding PDCCH monitoring. Upon having sent a SR on a PUCCH for a specific SR configuration, a UE may monitor PDCCH for the mapped DCI format only on the linked serving cell. In some embodiments, a UE may be configured for multiple active BWPs. A logical channel may be further associated with a distinct, different BWP such that a first logical channel is associated with a first BWP and a second logical channel is associated with a second BWP. In various embodiments, a buffer status report ("BSR") sent on a resource allocated on a first active BWP may include BSR for logical channels mapped to a second active BWP. In certain embodiments, a UE monitors a second BWP for PDCCH reception using a second DCI format associated with a second logical channel after transmitting a BSR including BSR for the second logical channel over a resource allocation on a first BWP. In some embodiments, a UE monitors a first BWP over which it has transmitted a BSR for a second logical channel for PDCCH transmitted using both a first DCI format and a second DCI format, the second DCI format allocating resources over the second BWP. In various embodiments, a SR configuration may be linked to a distinct BWP of a serving cell for monitoring PDCCH. A UE, upon having sent a SR on PUCCH for a configured SR configuration, may monitor PDCCH for an associated DCI format (e.g., UL DCI) on a linked DL BWP of a linked serving cell. As may be appreciated, a similar behavior may apply if the UE is configured in carrier aggregation mode. Moreover, different logical channels may be mapped to different carriers. In certain embodiments, a UE monitors different DCI formats on different carriers, the different DCI formats being configured to apply for different logical channels.

Figure 4:
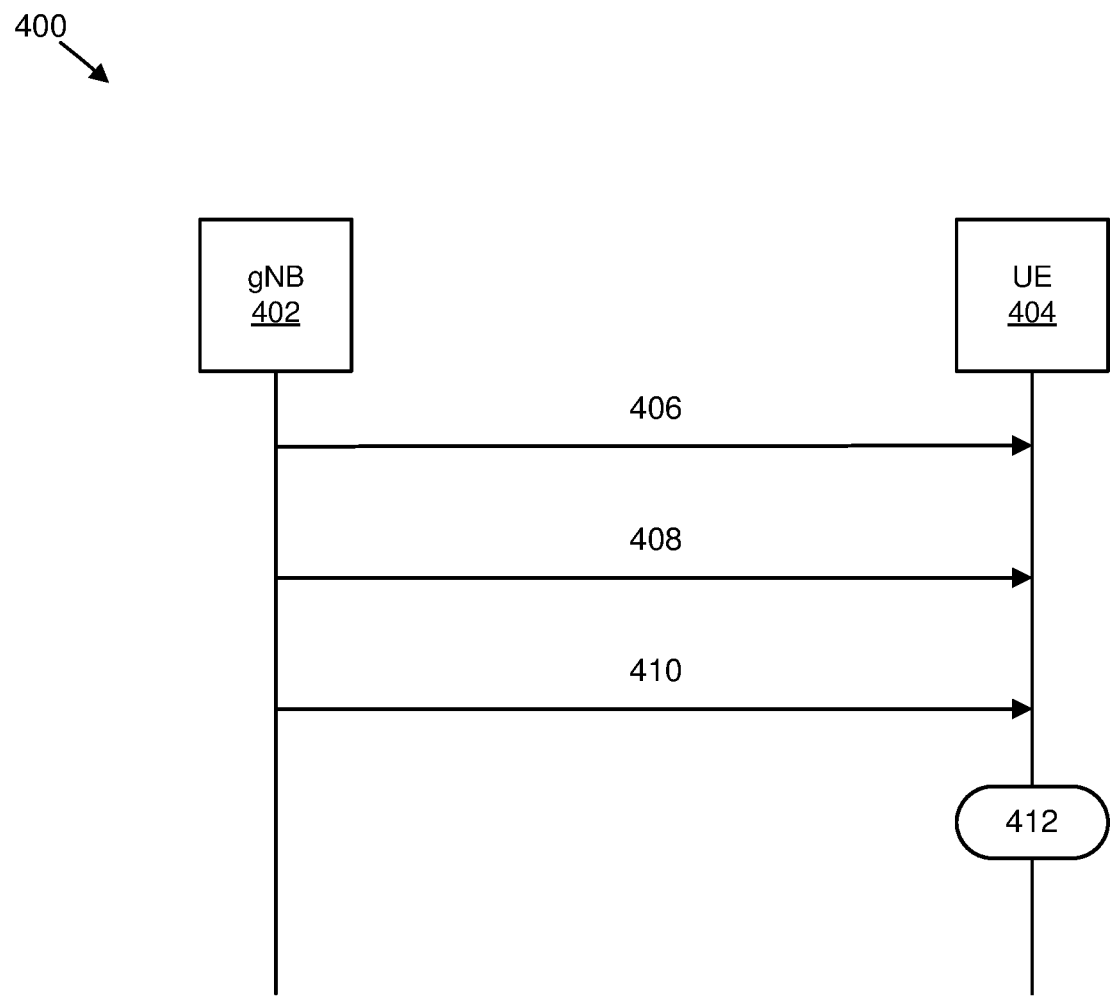
FIG. 4 is a schematic block diagram illustrating one embodiment of communications for monitoring for specific DCI formats.

FIG. 4 is a schematic block diagram illustrating one embodiment of communications 400 for monitoring for specific DCI formats. The communications 400 include messages transmitted between a gNB 402 and a UE 404. As may be appreciated, each of the communications 400 may include one or more messages.

In a first communication 406 transmitted from the gNB 402 to the UE 404, the gNB 402 transmits a first configuration for a first downlink control information format from a network entity to the UE 404. The first configuration is associated with a first search space set and a first scheduling request configuration.

In a second communication 408 transmitted from the gNB 402 to the UE 404, the gNB 402 transmits a second configuration for a second downlink control information format from the network entity to the UE 404. The second configuration is associated with a second search space set and a second scheduling request configuration.

In a third communication 410 transmitted from the gNB 402 to the UE 404, the gNB 402 transmits the first downlink control information format, the second downlink control information format, or a combination thereof.

The UE 404 monitors 412 physical downlink control channel candidates in a control resource set for the first downlink control information format, the second downlink control information format, or a combination thereof.

Figure 5:
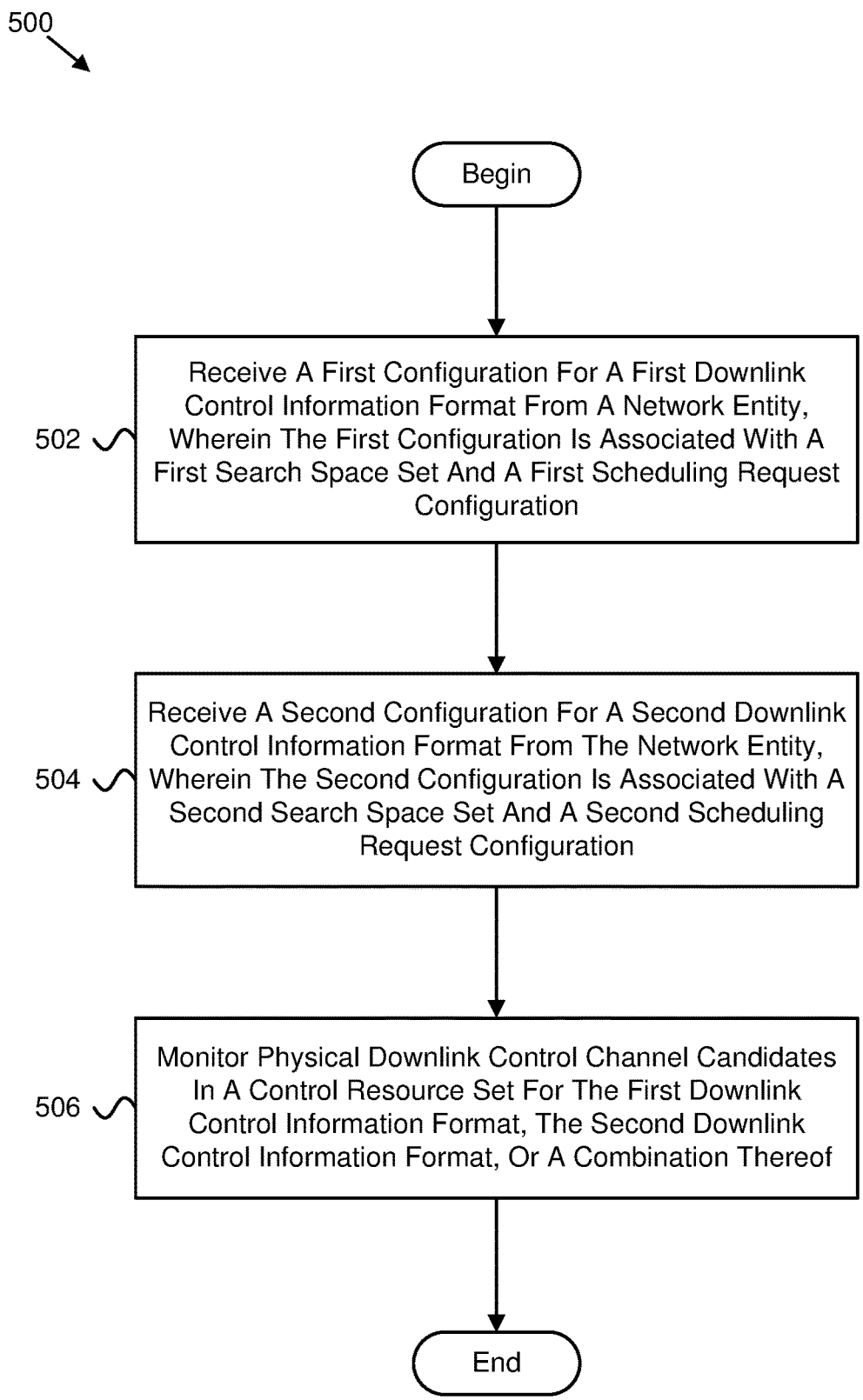
FIG. 5 is a flow chart diagram illustrating one embodiment of a method for monitoring downlink control information formats.

FIG. 5 is a flow chart diagram illustrating one embodiment of a method 500 for monitoring downlink control information formats. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes receiving 502 a first configuration for a first downlink control information format from a network entity. The first configuration is associated with a first search space set and a first scheduling request configuration. In some embodiments, the method 500 includes receiving 504 a second configuration for a second downlink control information format from the network entity. The second configuration is associated with a second search space set and a second scheduling request configuration. In certain embodiments, the method 500 includes monitoring 506 physical downlink control channel candidates in a control resource set for the first downlink control information format, the second downlink control information format, or a combination thereof.

In certain embodiments, the first configuration comprises a first set of parameters, the second configuration comprises a second set of parameters, and at least one parameter of the first set of parameters is different from at least one parameter of the second set of parameters. In some embodiments, the method 500 further comprises transmitting a scheduling request using the first scheduling request configuration, the second scheduling request configuration, or a combination thereof and determining which physical downlink control channel candidates to monitor based on whether uplink data is available for transmission in the first search space set, the second search space set, or a combination thereof based on the first scheduling request configuration, the second scheduling request configuration, or the combination thereof used for transmitting the scheduling request. In various embodiments, the method 500 further comprises receiving an indication in a control channel that indicates whether to monitor the physical downlink control channel candidates in the control resource set for the first downlink control information format, the second downlink control information format, or a combination thereof.

In one embodiment, the first configuration, the second configuration, or a combination thereof are received via radio resource control signaling. In certain embodiments, receiving the first configuration comprises receiving a first index value indicating the first configuration and receiving the second configuration comprises receiving a second index value indicating the second configuration. In some embodiments, each of the first configuration and the second configuration are associated with a logical channel identifier, a logical channel group identifier, a logical channel type, a logical channel priority, a quality of service class identifier, or some combination thereof.

In various embodiments, each of the first scheduling request configuration and the second scheduling request configuration corresponds to at least one logical channel or a medium access control control element. In one embodiment, monitoring the physical downlink control channel candidates in the control resource set for the first downlink control information format, the second downlink control information format, or the combination thereof comprises monitoring the physical downlink control channel candidates in the control resource set for the first downlink control information format, the second downlink control information format, or the combination thereof for a length of time indicated by a timer.

Figure 6:
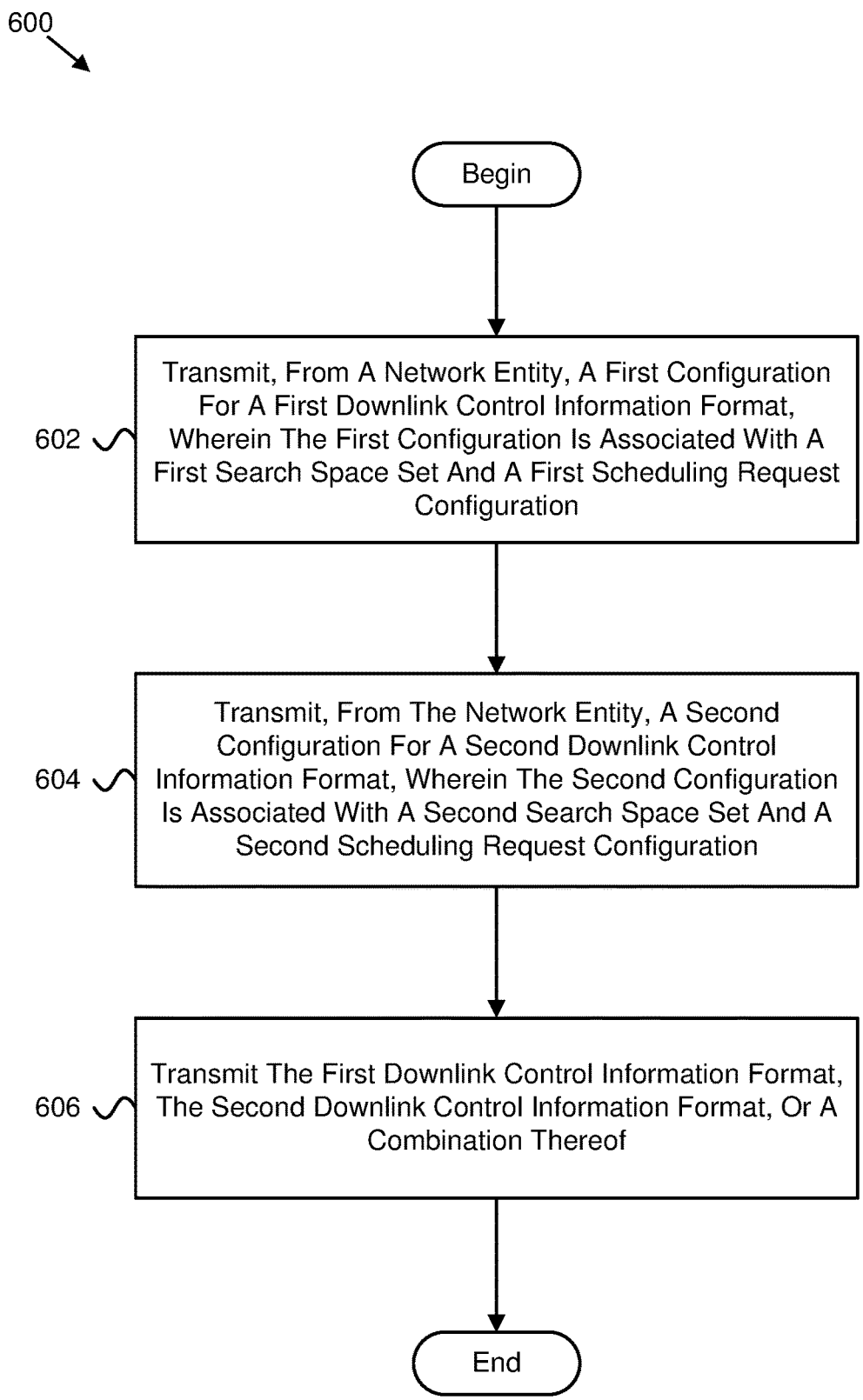
FIG. 6 is a flow chart diagram illustrating one embodiment of a method for transmitting downlink control information formats.

FIG. 6 is a flow chart diagram illustrating one embodiment of a method 600 for transmitting downlink control information formats. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes transmitting 602, from a network entity, a first configuration for a first downlink control information format. The first configuration is associated with a first search space set and a first scheduling request configuration. In some embodiments, the method 600 includes transmitting 604, from the network entity, a second configuration for a second downlink control information format. The second configuration is associated with a second search space set and a second scheduling request configuration. In certain embodiments, the method 600 includes transmitting 606 the first downlink control information format, the second downlink control information format, or a combination thereof.

In certain embodiments, the first configuration comprises a first set of parameters, the second configuration comprises a second set of parameters, and at least one parameter of the first set of parameters is different from at least one parameter of the second set of parameters. In some embodiments, the method 600 further comprises receiving a scheduling request using the first scheduling request configuration, the second scheduling request configuration, or a combination thereof. In various embodiments, the method 600 further comprises transmitting an indication in a control channel that indicates whether to monitor the physical downlink control channel candidates in the control resource set for the first downlink control information format, the second downlink control information format, or a combination thereof.

In one embodiment, the first configuration, the second configuration, or a combination thereof are transmitted via radio resource control signaling. In certain embodiments, transmitting the first configuration comprises transmitting a first index value indicating the first configuration and transmitting the second configuration comprises transmitting a second index value indicating the second configuration. In some embodiments, each of the first configuration and the second configuration are associated with a logical channel identifier, a logical channel group identifier, a logical channel type, a logical channel priority, a quality of service class identifier, or some combination thereof. In various embodiments, each of the first scheduling request configuration and the second scheduling request configuration corresponds to at least one logical channel or a medium access control control element.

In one embodiment, a method comprises: receiving a first configuration for a first downlink control information format from a network entity, wherein the first configuration is associated with a first search space set and a first scheduling request configuration; receiving a second configuration for a second downlink control information format from the network entity, wherein the second configuration is associated with a second search space set and a second scheduling request configuration; and monitoring physical downlink control channel candidates in a control resource set for the first downlink control information format, the second downlink control information format, or a combination thereof.

In certain embodiments, the first configuration comprises a first set of parameters, the second configuration comprises a second set of parameters, and at least one parameter of the first set of parameters is different from at least one parameter of the second set of parameters.

In some embodiments, the method further comprises transmitting a scheduling request using the first scheduling request configuration, the second scheduling request configuration, or a combination thereof and determining which physical downlink control channel candidates to monitor based on whether uplink data is available for transmission in the first search space set, the second search space set, or a combination thereof based on the first scheduling request configuration, the second scheduling request configuration, or the combination thereof used for transmitting the scheduling request.

In various embodiments, the method further comprises receiving an indication in a control channel that indicates whether to monitor the physical downlink control channel candidates in the control resource set for the first downlink control information format, the second downlink control information format, or a combination thereof.

In one embodiment, the first configuration, the second configuration, or a combination thereof are received via radio resource control signaling.

In certain embodiments, receiving the first configuration comprises receiving a first index value indicating the first configuration and receiving the second configuration comprises receiving a second index value indicating the second configuration.

In some embodiments, each of the first configuration and the second configuration are associated with a logical channel identifier, a logical channel group identifier, a logical channel type, a logical channel priority, a quality of service class identifier, or some combination thereof.

In various embodiments, each of the first scheduling request configuration and the second scheduling request configuration corresponds to at least one logical channel or a medium access control control element.

In one embodiment, monitoring the physical downlink control channel candidates in the control resource set for the first downlink control information format, the second downlink control information format, or the combination thereof comprises monitoring the physical downlink control channel candidates in the control resource set for the first downlink control information format, the second downlink control information format, or the combination thereof for a length of time indicated by a timer.

In one embodiment, an apparatus comprises: a receiver that: receives a first configuration for a first downlink control information format from a network entity, wherein the first configuration is associated with a first search space set and a first scheduling request configuration; and receives a second configuration for a second downlink control information format from the network entity, wherein the second configuration is associated with a second search space set and a second scheduling request configuration; and a processor that monitors physical downlink control channel candidates in a control resource set for the first downlink control information format, the second downlink control information format, or a combination thereof.

In certain embodiments, the first configuration comprises a first set of parameters, the second configuration comprises a second set of parameters, and at least one parameter of the first set of parameters is different from at least one parameter of the second set of parameters.

In some embodiments, the transmitter transmits a scheduling request using the first scheduling request configuration, the second scheduling request configuration, or a combination thereof and the processor determines which physical downlink control channel candidates to monitor based on whether uplink data is available for transmission in the first search space set, the second search space set, or a combination thereof based on the first scheduling request configuration, the second scheduling request configuration, or the combination thereof used for transmitting the scheduling request.

In various embodiments, the receiver receives an indication in a control channel that indicates whether to monitor the physical downlink control channel candidates in the control resource set for the first downlink control information format, the second downlink control information format, or a combination thereof.

In one embodiment, the first configuration, the second configuration, or a combination thereof are received via radio resource control signaling.

In certain embodiments, the receiver receiving the first configuration comprises the receiver receiving a first index value indicating the first configuration and receiving the second configuration comprises receiving a second index value indicating the second configuration.

In some embodiments, each of the first configuration and the second configuration are associated with a logical channel identifier, a logical channel group identifier, a logical channel type, a logical channel priority, a quality of service class identifier, or some combination thereof.

In various embodiments, each of the first scheduling request configuration and the second scheduling request configuration corresponds to at least one logical channel or a medium access control control element.

In one embodiment, the processor monitoring the physical downlink control channel candidates in the control resource set for the first downlink control information format, the second downlink control information format, or the combination thereof comprises the processor monitoring the physical downlink control channel candidates in the control resource set for the first downlink control information format, the second downlink control information format, or the combination thereof for a length of time indicated by a timer.

In one embodiment, a method comprises: transmitting, from a network entity, a first configuration for a first downlink control information format, wherein the first configuration is associated with a first search space set and a first scheduling request configuration; transmitting, from the network entity, a second configuration for a second downlink control information format, wherein the second configuration is associated with a second search space set and a second scheduling request configuration; and transmitting the first downlink control information format, the second downlink control information format, or a combination thereof.

In certain embodiments, the first configuration comprises a first set of parameters, the second configuration comprises a second set of parameters, and at least one parameter of the first set of parameters is different from at least one parameter of the second set of parameters.

In some embodiments, the method further comprises receiving a scheduling request using the first scheduling request configuration, the second scheduling request configuration, or a combination thereof.

In various embodiments, the method further comprises transmitting an indication in a control channel that indicates whether to monitor the physical downlink control channel candidates in the control resource set for the first downlink control information format, the second downlink control information format, or a combination thereof.

In one embodiment, the first configuration, the second configuration, or a combination thereof are transmitted via radio resource control signaling.

In certain embodiments, transmitting the first configuration comprises transmitting a first index value indicating the first configuration and transmitting the second configuration comprises transmitting a second index value indicating the second configuration.

In some embodiments, each of the first configuration and the second configuration are associated with a logical channel identifier, a logical channel group identifier, a logical channel type, a logical channel priority, a quality of service class identifier, or some combination thereof.

In various embodiments, each of the first scheduling request configuration and the second scheduling request configuration corresponds to at least one logical channel or a medium access control control element.

In one embodiment, an apparatus comprises a network entity. The apparatus further comprises: a transmitter that: transmits a first configuration for a first downlink control information format, wherein the first configuration is associated with a first search space set and a first scheduling request configuration; transmits a second configuration for a second downlink control information format, wherein the second configuration is associated with a second search space set and a second scheduling request configuration; and transmits the first downlink control information format, the second downlink control information format, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving, from a base station, a first configuration for a first downlink control information (DCI) format, wherein the first configuration is associated with a first search space set and a first scheduling request configuration;
   receiving, from the base station, a second configuration for a second DCI format, wherein the second configuration is associated with a second search space set and a second scheduling request configuration; and
   monitoring physical downlink control channel (PDCCH) candidates in a control resource set (CORESET) for the first DCI format, or the second DCI format, or both, wherein each of the first configuration and the second configuration are associated with one or more of a logical channel (LCH) identifier (ID), a LCH group ID, a LCH type, a LCH priority, or a quality of service class ID.

2. The method of claim 1, wherein the first configuration comprises a first set of parameters, the second configuration comprises a second set of parameters, and at least one parameter of the first set of parameters is different from at least one parameter of the second set of parameters.

3. The method of claim 1, further comprising transmitting a scheduling request using the first scheduling request configuration, or the second scheduling request configuration, or both and determining which PDCCH candidates to monitor based on whether uplink data is available for transmission in the first search space set, or the second search space set, or both based on the first scheduling request configuration, or the second scheduling request configuration, or both used for transmitting the scheduling request.

4. The method of claim 1, further comprising receiving an indication in a control channel that indicates whether to monitor the PDCCH candidates in the CORESET for the first DCI format, or the second DCI format, or both.

5. The method of claim 1, wherein the first configuration, or the second configuration, or both are received via radio resource control (RRC) signaling.

6. The method of claim 1, wherein receiving the first configuration comprises receiving a first index value indicating the first configuration and receiving the second configuration comprises receiving a second index value indicating the second configuration.

7. The method of claim 1, wherein each of the first scheduling request configuration and the second scheduling request configuration corresponds to at least one logical channel or a medium access control control element (MAC CE).

8. The method of claim 1, wherein monitoring the candidates in the CORESET for the first DCI format, or the second DCI format, or both comprises monitoring the PDCCH candidates in the CORESET for the first DCI format, or the second DCI format, or both for a length of time indicated by a timer.

9. A user equipment (UE), comprising:
at least one memory; and
at least one processor coupled with the at least one memory and configured to cause the UE to:
receive, from a base station, a first configuration for a first downlink control information format, wherein the first configuration is associated with a first search space set and a first scheduling request configuration; and
receive, from the base station, a second configuration for a second DCI format, wherein the second configuration is associated with a second search space set and a second scheduling request configuration; and
monitor physical downlink control channel (PDCCH) candidates in a control resource set (CORESET) for the first DCI format, or the second DCI format, or both, wherein each of the first configuration and the second configuration are associated with one or more of a logical channel (LCH) identifier (ID), a LCH group ID, a LCH type, a LCH priority, or a quality of service class ID.

10. The UE of claim 9, wherein the first configuration comprises a first set of parameters, the second configuration comprises a second set of parameters, and at least one parameter of the first set of parameters is different from at least one parameter of the second set of parameters.

11. The UE of claim 9, wherein the at least one processor is configured to cause the UE to transmit a scheduling request using the first scheduling request configuration, or the second scheduling request configuration, or both and determining which PDCCH candidates to monitor based on whether uplink data is available for transmission in the first search space set, or the second search space set, or both based on the first scheduling request configuration, or the second scheduling request configuration, or both used for transmitting the scheduling request.

12. The UE of claim 9, wherein the at least one processor is configured to cause the UE to receive an indication in a control channel that indicates whether to monitor the PDCCH candidates in the CORESET for the first DCI format, or the second DCI format, or both.

13. The UE of claim 9, wherein the first configuration, or the second configuration, or both are received via radio resource control (RRC) signaling.

14. The UE of claim 9, wherein the at least one processor is configured to cause the UE to receive a first index value indicating the first configuration and receiving the second configuration comprises receiving a second index value indicating the second configuration.

15. The UE of claim 9, wherein each of the first scheduling request configuration and the second scheduling request configuration corresponds to at least one logical channel or a medium access control control element (MAC CE).

16. The UE of claim 9, wherein the at least one processor is configured to cause the UE to monitor PDCCH candidates in the CORESET for the first DCI format, or the second DCI format, or both for a length of time indicated by a timer.

17. A base station, comprising:
at least one memory; and
at least one processor coupled with the at least one memory and configured to cause the base station to:
transmit a first configuration for a first downlink control information (DCI) format, wherein the first configuration is associated with a first search space set and a first scheduling request configuration;
transmit a second configuration for a second DCI format, wherein the second configuration is associated with a second search space set and a second scheduling request configuration; and
transmit the first DCI format, or the second DCI format, or both, wherein each of the first configuration and the second configuration are associated with one or more of a logical channel (LCH) identifier (ID), a LCH group ID, a LCH type, a LCH priority, or a quality of service class ID.

18. The base station of claim 17, wherein the first configuration comprises a first set of parameters, the second configuration comprises a second set of parameters, and at least one parameter of the first set of parameters is different from at least one parameter of the second set of parameters.

* * * * *